March 17, 1925.
V. HOPE
ELECTRIC FUSE
Filed Oct. 16, 1924
1,530,264
2 Sheets-Sheet 1
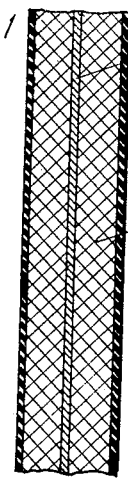
FIG.1
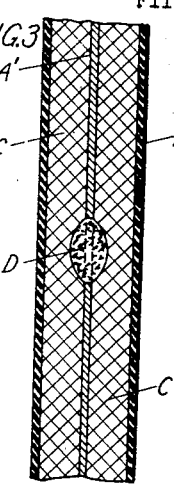
FIG.3
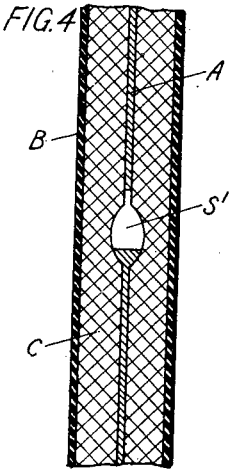
FIG.4
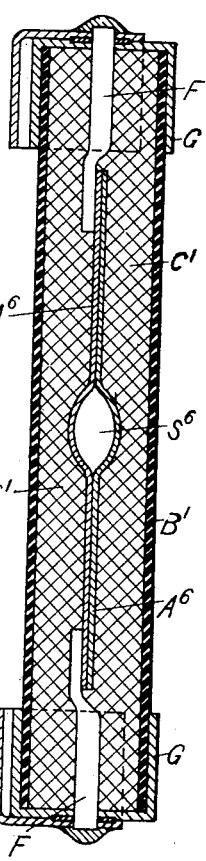
FIG.12
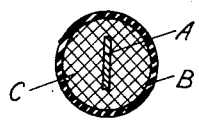
FIG.2
FIG.5
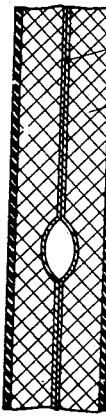
FIG.6
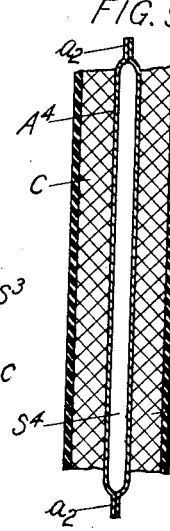
FIG.7
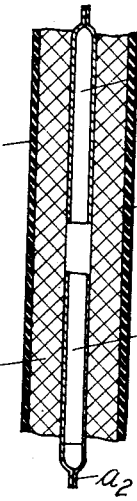
FIG.9 FIG.10
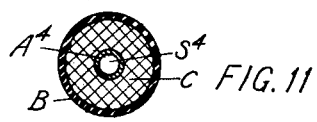
FIG.8 FIG.11
INVENTOR:
VERNON HOPE
By Spear, Middleton, Donaldson & Spear
Attys.

March 17, 1925.    1,530,264
V. HOPE
ELECTRIC FUSE
Filed Oct. 16, 1924    2 Sheets-Sheet 2
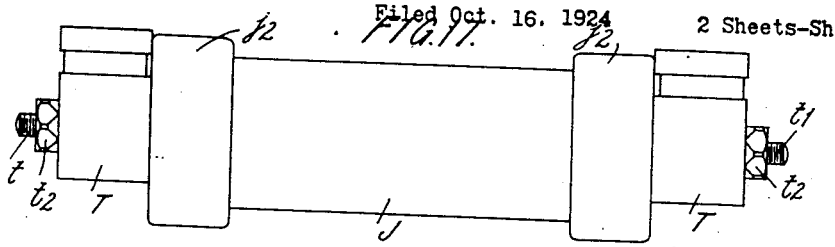
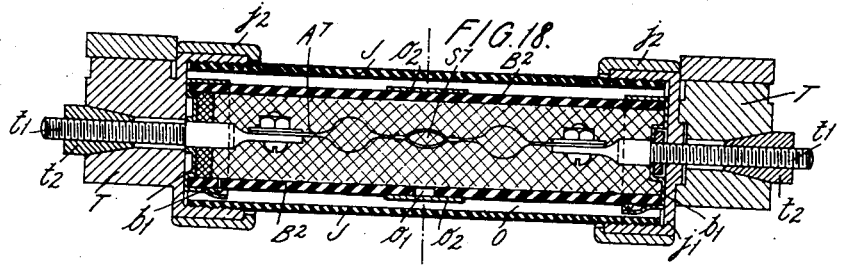
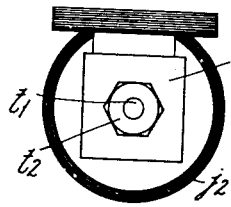
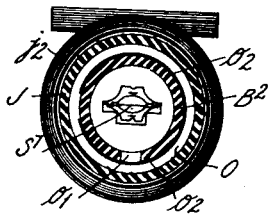
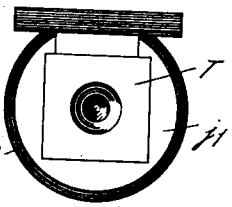
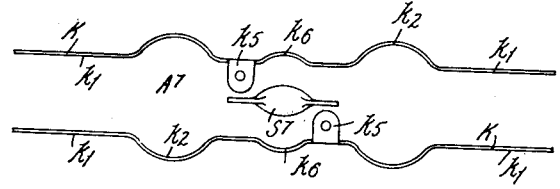
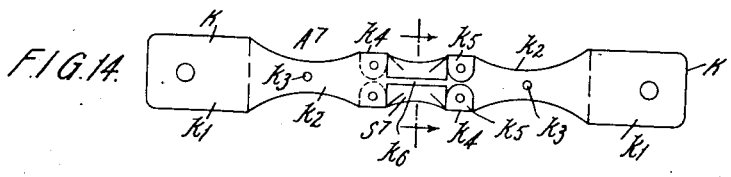
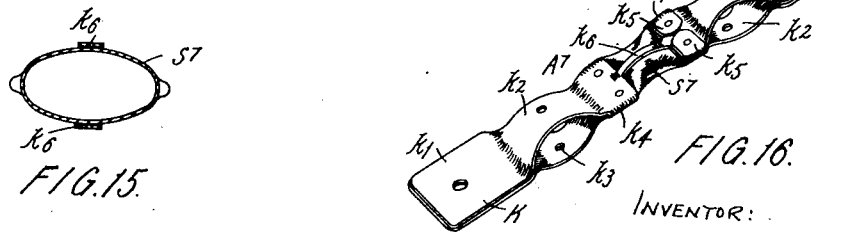
INVENTOR:
VERNON HOPE Patented Mar. 17, 1925.

1,530,264

UNITED STATES PATENT OFFICE.

VERNON HOPE, OF MACCLESFIELD, ENGLAND.

ELECTRIC FUSE.

Application filed October 16, 1924. Serial No. 743,984.

*To all whom it may concern:*

Be it known that I, VERNON HOPE, a subject of the King of Great Britain, and residing in Macclesfield, in the county of Chester, England, have invented certain new and useful Improvements in Electric Fuses, of which the following is a specification.

This invention relates to electrical fuses of the powder-filled cartridge type; such fuses constructed in the usual way are adapted satisfactorily to open the circuit which they control when the current exceeds by a considerable amount the normal current which they are designed to carry, as for example when a short circuit occurs; but their action is less certain when they are designed to fuse under moderate overloads which the apparatus to be protected, for example an electro-motor, could not safely carry continuously.

In the powder-filled fuse the fusible element is supported in what is practically a close fitting conduit formed in the usual refractory powder with which the container is packed; the fuse is, of course, heated when it carries the normal current, and this heat has the effect of compacting the powder in contact with the fuse; when therefore the fuse is melted or partly melted by the moderate overload by which it is designed to be fused the molten or plastic metal is caused to retain its shape in the conduit formed, in the powder, as described, so that the said overload is carried without breaking the circuit; this results in further heating which without, breaking the circuit, tends to damage the fuse parts by over heating, and the object of the present invention is to overcome this difficulty by providing, in the path of the fusible element, what I term a subsidence cavity the transverse cross-sectional area of which is greater than that of the contiguous portion of the fusible element, into which cavity, when the fuse melts the plastic or molten metal subsides and so breaks the circuit. According to the invention the cavity is so constructed that it is free from air or other substance which would support combustion and which, upon an arc being formed by an excessive overload, by combining with the volatilized fusible metal would produce an explosive pressure tending to burst the containing vessel; the cavity must of course also be free from any explosive substance adapted to be ignited when the fuse is heated, and I find that the most satisfactory way of ensuring these conditions is to form the cavity within a tubular, or equivalent, fusible element, and to initially charge the cavity with an inert gas such as carbon di-oxide.

I have illustrated my invention in the accompanying drawings in which:—

Figs. 1 and 2 show the usual arrangement of the ordinary fuse element in an enclosed powder-filled cartridge fuse.

Figs. 3 to 11 show diagrammatically several modes of construction whereby the subsidence cavity may be formed.

Fig. 12 shows the arrangement of the fusible element of Figs. 6, 7 and 8, applied to the ordinary type of powder-filled cartridge replacement fuse.

Figs. 13 to 16 show the preferred form of construction of the fusible element, and Figs. 17 to 21 show the preferred form of enclosing casing for use with the preferred form of strip.

In Figs. 1 and 2, A is the fuse element, B the cartridge and C the powder. These letters will be used throughout the specification to denote these several parts, the different types of fuse elements being distinguished by the addition of a numeral to the letter of designation. As stated, with this arrangement the fuse is supported in what is practically a close fitting conduit, the cross-sectional area of which at each point is equal to that of the strip, an arrangement which tends to prevent the breaking of continuity when the fuse melts, but which difficulty is overcome by providing a subsidence cavity as described.

In Figs. 3, 4 and 5 a subsidence cavity S' is formed by providing at or near the centre of the fuse element, before it is inserted in the cartridge and the latter filled with powder, a core D of a material which will readily burn when the fuse gets hot, without leaving much ash. This may be accomplished by lightly wrapping round the fuse element silk or the like thread till the desired configuration of core is obtained; the fuse so prepared is inserted in the cartridge and the latter filled with powder.

When the fuse element is heated, but before it is melted by the passage of the current the material of the core is burnt away thus leaving a subsidence cavity as shown at S' Fig. 4. The fuse element is designed to melt when it carries a given overload for the prescribed period, and as the fuse usually melts at the centre of its length, and at or near the subsidence chamber, and may be designedly arranged to do this by the reduction of its current-carrying capacity at the centre of its length, it will be seen that since the cross-sectional area of the subsidence cavity is greater than that of the fuse element, the molten portion of the latter by flowing into and accumulating in the subsidence cavity ensures the breaking of continuity of the fusible element and the breaking of the circuit.

In order to form a subsidence cavity within the fuse element, and free from any substance which will explode or support combustion, the arrangement shown in the Figs. 6 to 8 is adopted. In this case the fusible element is made in the form of a length of tube $A^3$ and the tube is, preparatorily to its introduction into the cartridge, filled with an inert gas such as carbon di-oxide gas, and whilst the tube contains the gas it is flattened from each end towards the centre so as to leave a bulbous portion at the centre, which of course will be filled with the inert gas which is retained therein by soldering the closed ends of the tube or by sweating together the abutting faces of the flattened portions of the tube. The action is as already described, but with the added advantage that the cavity is filled with an inert gas tending to prevent the formation of an arc.

The subsidence cavity instead of being located at a point at the centre of the fuse element, may extend for a substantial portion of its length; in this case, as shown in Figs. 9, 10 and 11, a tube $A^4$ similar to that last described but of much smaller diameter is filled with an inert gas and its ends $a^2$ flattened and sealed; when the tube is fused the molten metal flows to the bottom of the subsidence chamber thus formed by the bore of the tube.

In Fig. 12 the fusible element constructed in accordance with Figs. 6 to 8 is shown fitted in the usual form of powder-filled cartridge fuse, the fusible element $A^6$ being attached to terminal pieces F, the ends of which are soldered to a closing cap G, contact plates H being fitted to the ends of the casing B' which is filled with the usual filling powder employed in fuses of this type.

The preferred form of fuse element constructed in accordance with the present invention is that in which the subsidence cavity is formed of an easily fusible metal such as zinc or tin carried by a main fuse element composed of a metal which is a comparatively good conductor and having a comparatively high fusing point, such as copper, arranged in such a manner as to combine the advantages obtained by the use of the subsidence chamber, with the further advantage obtained by the use of a bi-metallic fusible element.

Such a fusible element $A^7$ is shown in Figs. 13 to 16 and is constructed as follows:
The fusible element comprises two strips of copper K, and a bulbous gas filled subsidence cavity $S^7$ formed by flattening the ends of a gas filled tin tube as above described. The width of each copper strip at the ends $k^1$ is sufficient to ensure good pressure contact with the terminal ends; the current carrying capacity of the strips is reduced at $k^2$, say by reducing the width, and the cross sectional area may be further reduced at these points by drilling holes $k^3$; the width of the strip K is increased at the parts $k^4$ and at these points side lugs $k^5$ are formed. At $k^6$ the width of the strip is very materially reduced so that this part forms a narrow isthmus-like connection between the two end portions of the strip. The copper strips are assembled together with a subsidence cavity portion $S^7$ so arranged that it forms an electrical connection between the parts $k^4$ of the copper strip so as to supplement the current carrying capacity of the narrow strip $k^6$, the lugs $k^5$ being bent over the flattened ends of $S^7$ and the parts being secured together in any suitable manner, say by riveting, sweating, or electro-plating, the parts $k^2$ being maintained slightly separated as shown.

I have shown in Figs. 17 to 21 the preferred arrangement of fuse container for the fuse element and subsidence cavity constructed in accordance with the invention. The fusible element say $A^7$ is mounted in a fuse container $B^2$ which is filled with a suitable powder and has its ends closed by end caps $b^1$ through which the terminal screws $t^1$ pass, the contact between the latter and the fuse contacts T being made by coned nuts $t^2$. The fuse container is enclosed within an outer casing J, the one end of which is closed by one of the contacts T and the other end of which is closed by an end cap $j^1$, through which the terminal $t^1$ passes. $J^2$ are fibre insulating collars. There is thus formed between the outer casing J and the fuse container $B^2$ an expansion chamber O and the interior of $B^2$ communicates with the expansion chamber O through an opening $o^1$ which is closed by an adhesive cap $o^2$ of paper or the like, which cap is fractured by the pressure of the gases on the blowing of the fuse, the gases escaping through the opening so formed into the expansion chamber and preventing an undue rise of pressure in the fuse container or the expansion chamber.

With an ordinary overload current the fuse which is arranged vertically blows by the melting of the metal of comparatively low fusing point of which $S^7$ is composed, the molten metal flowing to the subsidence chamber so that the path of the current through $S^7$ is broken, whereupon the whole of the current is carried by the portions $k^6$ which are at once fused thereby.

In the case of a heavy short circuit the copper fuse ruptures at the points $k^2$ without volatilizing the metal of which the part $S^7$ is composed. The fusible element thus serves equally well on a direct short-circuit and on a long overload.

The several methods of forming the subsidence cavity are given by way of example, but the details of construction may be varied in accordance with the type and duty of the fuse provided that a suitable subsidence cavity is formed as described into which the molten metal may subside and so break continuity. The fusible element would when possible be arranged vertically, but should a horizontal arrangement be unavoidable the subsidence cavity must be arranged so that the molten metal flowing into it falls clear of the remaining part of the fuse so as to effectively break the circuit.

Having now particularly described the nature of my invention, I declare that what I claim and desire to secure by Letters Patent is:—

1. The improvement in electrical fuses of the powder-filled cartridge type which consists in forming a cavity enclosed by the fusible element, and into which cavity the part of the fusible element which melts subsides and so breaks the continuity of the fusible element.

2. The improvement in electrical fuses which consists in forming a cavity enclosed by the fusible element, said cavity being filled with an inert gas, the transverse cross-sectional area of the cavity being greater than the transverse cross-sectional area of the contiguous portion of the fusible element, and into which cavity the part of the fusible element which melts subsides and so breaks the continuity of the fusible element.

3. The improvement in electrical fuses of the powder-filled cartridge type in which the fusible element is for part of its length composed of a metal of high fusing point and of a metal of low fusing point, which consists in forming a cavity enclosed by the metal of low melting point, and into which cavity the low melting point fusible metal subsides when it melts.

4. The improvement in electrical fuses of the powder-filled cartridge type in which the fusible element is for part of its length composed of a metal of high fusing point and of a metal of low fusing point, which consists in forming in the metal of low fusing point a cavity filled with an inert gas, and into which cavity the low melting point fusible metal subsides when it melts.

5. In an electric fuse in combination;—a casing; a fusible element located in the said casing; terminal contacts located outside the said casing and connected to the fusible element; a refractory powder filling for the said casing; a cavity enclosed by the fusible element, and having a transverse cross-sectional area greater than that of the contiguous part of the fusible element into which cavity said part of the fusible element subsides when it melts and breaks the continuity of the fusible element.

6. In an electric fuse in combination;—a casing; a fusible element located in the said casing; terminal contacts located outside the said casing and connected to the fusible element; a refractory powder filling for the said casing; a cavity enclosed by the fusible element, said cavity being filled with an inert gas, and having a transverse cross-sectional area greater than that of the contiguous part of the fusible element into which cavity said part of the fusible element subsides when it melts and breaks the continuity of the fusible element.

7. In an electric fuse in combination;— a casing; a fusible element located in the said casing, part of the fusible element consisting of two metals arranged in parallel, the fusing point of the one metal being lower than that of the other; terminal contacts located outside the casing and connected to the fusible element; a powder filling for said casing; a cavity formed contiguously to the metal of low melting point, and having a transverse cross-sectional area greater than that of the said metal of low melting point and into which the said metal subsides when it melts.

8. In an electric fuse in combination;— a casing; a fusible element located in the said casing, part of the fusible element consisting of two metals arranged in parallel, the fusing point of the one metal being lower than that of the other; terminal contacts located outside the casing and connected to the fusible element; a powder filling for said casing; a cavity formed contiguously to the metal of low melting point, said cavity being filled with an inert gas, and having a transverse cross-sectional area greater than that of the said metal of low melting point and into which the said metal subsides when it melts.

9. The improvement in electrical fuses of the powder filled cartridge type in which the fusible element is for a part of its length composed of a metal of high fusing point and of a metal of low fusing point arranged in parallel, which consists in forming a cavity in proximity to the metal of low fusing point, the transverse cross-sectional area of the cavity being greater than the transverse cross-sectional area of the contiguous portion of the fusible element, and into which cavity the low melting point fusible metal subsides when it melts, according to which the cross-sectional area of the metal of high fusing point in the bi-metallic part of the fuse is less than that required to carry the normal current.

10. The improvement in electrical fuses of the powder filled cartridge type in which the fusible element is for a part of its length composed of a metal of high fusing point and of a metal of low fusing point arranged in parallel, which consists in forming a cavity in proximity to the metal of low fusing point, the transverse cross-sectional area of the cavity being greater than the transverse cross-sectional area of the contiguous portion of the fusible element, and into which cavity the low melting point fusible metal subsides when it melts, according to which the cross-sectional area of the metal of high fusing point in the bi-metallic part of the fuse is less than that required to carry the normal current, and in which the cross-sectional area of the fusible element is reduced at points on opposite sides of the bi-metallic portion.

11. In an electric fuse, in combination; a casing; a fusible element located in said casing, and comprising a metal of comparatively high fusing point and a metal of comparatively low fusing point, the cross-sectional area of the metal of high fusing point being reduced at a point intermediate the ends so as to be insufficient to carry the normal current, the cross-sectional area of the said metal being also reduced at points on opposite sides of the first mentioned reduced cross-sectional area; the metal of low fusing point being connected to the metal of high fusing point so as to bridge over the first mentioned reduced cross-sectional area; terminal connections located outside said casing and connected to the ends of the metal of high fusing point; a powder filling for the said casing; and a cavity formed contiguously to the metal of low fusing point.

12. In an electric fuse, in combination; a casing; a fusible element located in said casing, and comprising a metal of comparatively high fusing point and a metal of comparatively low fusing point, the cross-sectional area of the metal of high fusing point being reduced at a point intermediate the ends so as to be insufficient to carry the normal current, the cross-sectional area of the said metal being also reduced at points on opposite sides of the first mentioned reduced cross-sectional area; the metal of low fusing point being provided with a cavity; terminal connections located outside the casing and connected to the ends of the metal of high fusing point; and a powder filling for the said casing.

In witness whereof I set my hand in presence of two witnesses.

VERNON HOPE.

Witnesses:
JOHN W. CONNERS,
JOSEPH E. HIRST.